Feb. 26, 1935. H. E. TAUTZ 1,992,726
HOLLOW MORTISING CHISEL
Filed Sept. 15, 1934
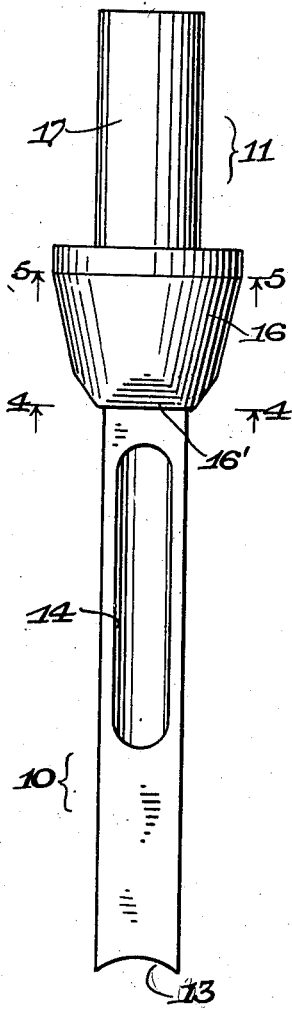
FIG. 1
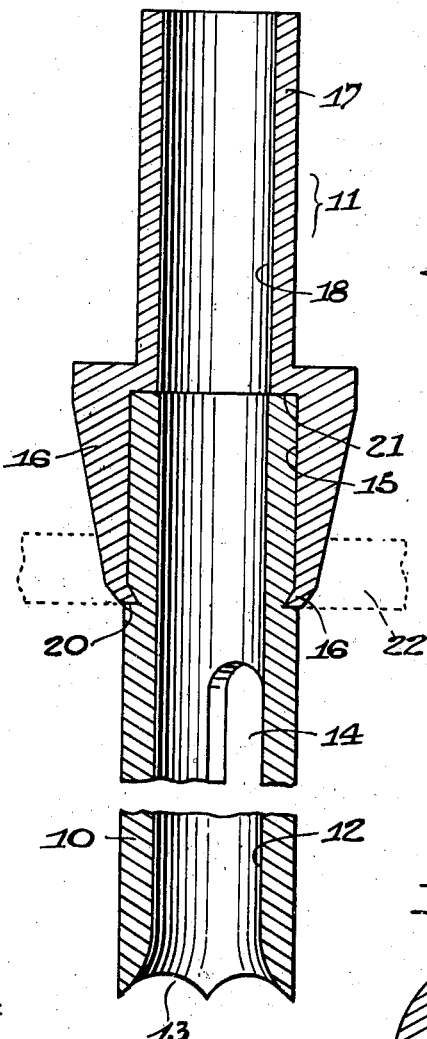
FIG. 2
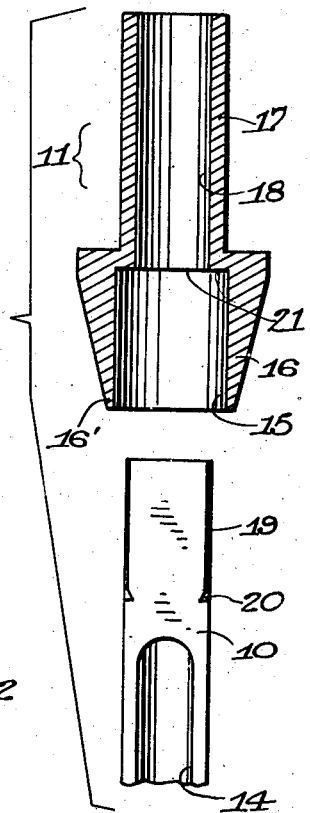
FIG. 3
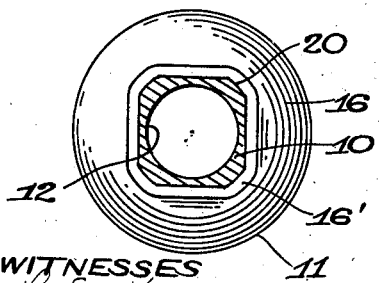
FIG. 4
FIG. 5
WITNESSES
L. E. Kilian
C. L. Waal
INVENTOR
Herbert E. Tautz,
By R. S. Caldwell
ATTORNEY Patented Feb. 26, 1935

1,992,726

UNITED STATES PATENT OFFICE 1,992,726

HOLLOW MORTISING CHISEL

Herbert E. Tautz, Milwaukee, Wis., assignor to The Delta Manufacturing Company, Milwaukee, Wis., a corporation of Wisconsin Application September 15, 1934, Serial No. 744,153

4 Claims. (Cl. 145—24)

The invention relates to hollow mortising chisels of the type having a longitudinal opening for receiving a rotatable bit.

It has heretofore been customary to construct a hollow mortising chisel from a single piece of tool steel, which has required the use of a relatively large piece of expensive stock and has necessitated a number of shaping operations, involving considerable waste.

It is an object of the present invention to provide a durable but inexpensive hollow mortising chisel of composite construction in which the amount of edge-retaining steel is greatly reduced without impairing strength and cutting qualities, and in which the parts are rigidly and accurately secured together in a simple but effective manner, the construction being of such character as to facilitate manufacture and to reduce waste of material.

The invention further consists in the several features hereinafter described and claimed.

One specific embodiment of the invention is shown in the accompanying drawing, in which Fig. 1 is a side view of a hollow mortising chisel constructed in accordance with the invention;

Fig. 2 is a longitudinal sectional view of the chisel, parts being broken away;

Fig. 3 is a view of the cutting member and shank before they are secured together, the shank being shown in longitudinal section;

Fig. 4 is a transverse sectional view taken on the line 4—4 of Fig. 1, and

Fig. 5 is a transverse sectional view taken on the line 5—5 of Fig. 1.

In the drawing, 10 designates a hollow cutting member or bar, and 11 a hollow shank receiving therein one end portion of the cutting member.

The cutting member or bar 10 is formed of a metal capable of holding a cutting edge, preferably high-carbon tool steel, the bar being square in cross-section and having a width equal to the width of the mortise to be formed in the work. A central bore 12 extends longitudinally through the bar, and one end of the bar has formed thereon the usual marginal chisel edge 13. The customary slot 14 is cut along one side face of the bar to form an outlet for shavings.

The other end of the bar fits tightly in a bore 15 formed centrally in a conical head 16 on the shank 11, the shank having a cylindrical stem 17 concentric with the head and provided with a bore 18 which is preferably slightly larger than the bore 12. The shank 11 is formed of some strong inexpensive metal, such as low-carbon steel. As seen in Fig. 5, the side edges of the bar 10 are preferably broken or chamfered at 19 along the end portion of the bar fitting in the bore 15.

The hollow cutting bar 10 is provided in its side edges with notches 20 to register with the reduced annular end portion 16' of the conical head 16, the notches being conveniently formed by a turning operation.

In assembling the device, the chamfered end of the cutting bar 10 is pressed into the bore 15 of the shank 11 until the bar abuts against a shoulder 21 formed at the inner end of the bore. The close fit of the parts holds them in axial alignment. The parts are then secured rigidly together by pressing the annular outer end portion 16' of the conical head 16 inwardly into the notches 20 of the chisel bar, as seen in Fig. 2, and inwardly against the flat sides of the cutting bar, as seen in Figs. 1 and 4. The pressing operation may be effected by means of a suitable tool or die 22.

When the chisel is in use, it co-operates in the usual manner with a rotary bit 23 (Fig. 5) which passes through it, the chisel being held against rotation by clamping its stem 17 in any suitable manner.

The cutting member or bar 10 can be economically formed from tool steel bar stock of square cross-section, there being but little waste. The somewhat larger shank 11 can be economically formed from inexpensive metal, such as low-carbon steel, by a simple turning operation.

What I claim as new and desire to secure by Letters Patent is:

1. A mortising chisel comprising a hollow bar of edge-retaining metal having a chisel edge at one end and recessed outer side walls adjacent the other end, and a hollow shank of softer metal having an opening tightly receiving the end of the bar distant from said chisel edge and having inwardly pressed side walls projecting into and engaging said recessed side walls of the bar.

2. A mortising chisel comprising a hollow bar of square cross-section formed of edge-retaining metal, said bar having a chisel edge at one end and notches adjacent the other end formed in the side edges of the bar, and a hollow shank of softer metal having a bore tightly receiving the end of the bar distant from said chisel edge and having inwardly pressed side walls projecting into said notches and engaging the side faces of said bar.

3. A mortising chisel comprising a hollow bar of square cross-section formed of edge-retaining metal, said bar having a chisel edge at one end and being notched adjacent the other end, and a hollow shank of softer metal having a head provided with a bore tightly receiving the notched end portion of said bar, said head having an inwardly pressed annular edge portion of reduced thickness adjacent the outer end of said bore, said reduced edge portion projecting into and engaging the notched portion of said bar.

4. A mortising chisel comprising a hollow bar of square cross-section formed of edge-retaining metal and having a chisel edge at one end, and a hollow shank of softer metal having a substantially cylindrical bore tightly receiving the other end of said bar and having inwardly pressed side walls engaging the side faces of said bar.

HERBERT E. TAUTZ.